United States Patent [19]
Mueller et al.

[11] 3,834,238
[45] Sept. 10, 1974

[54] ELECTRONIC THERMOMETER

[75] Inventors: Fritz Kurt Mueller; Billy Otis Martin; Robert Cherry Martin; Bobby Joe Stricklin; Raymond Leland Weeks, all of Huntsville, Ala.

[73] Assignee: Royal Medical Corporation, Huntsville, Ala.

[22] Filed: Aug. 19, 1971

[21] Appl. No.: 173,115

[52] U.S. Cl. ...... 73/362 AR, 235/92 MT, 324/99 D, 340/347 AD
[51] Int. Cl. .... G01g 7/24, G01r 17/04, H03k 13/17
[58] Field of Search .................. 73/362 R, 362 AR; 324/99 D; 340/347 AD; 235/92 MT

[56] References Cited
UNITED STATES PATENTS

| | | | |
|---|---|---|---|
| 2,717,994 | 9/1955 | Dickinson | 340/347 AD |
| 2,880,392 | 3/1959 | Paulsen | 324/99 D |
| 2,909,676 | 10/1959 | Thomas | 340/347 AD UX |
| 2,956,271 | 10/1960 | Keller | 340/347 AD |
| 3,054,960 | 9/1962 | Pearlman | 340/347 AD X |
| 3,477,292 | 11/1969 | Thornton | 73/362 AR |
| 3,550,448 | 12/1970 | Ensign | 73/362 AR X |
| 3,702,076 | 11/1972 | Georgi | 73/362 AR |

Primary Examiner—Richard C. Queisser
Assistant Examiner—Frederick Shoon
Attorney, Agent, or Firm—Alvin Edward Moore

[57] ABSTRACT

An electronic thermometer having: a temperature-sensitive probe and one of two optional electronic circuits, each of which has means for changing a basic comparison voltage in steps or increments through a series of stair-stepped voltages toward the amplified small voltage from the thermistor until the stabilized thermistor voltage and the comparison voltage are equal, and indicating the result in degrees. One of these circuits comprises a stairstep generator, and the other a set of resistors of different values.

3 Claims, 4 Drawing Figures

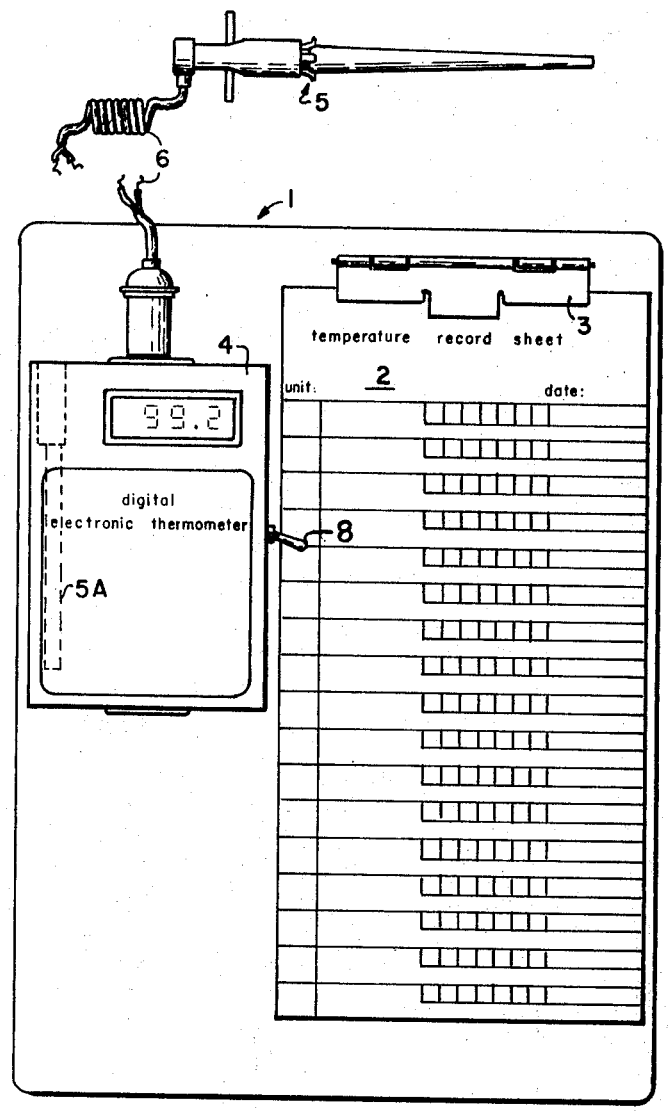
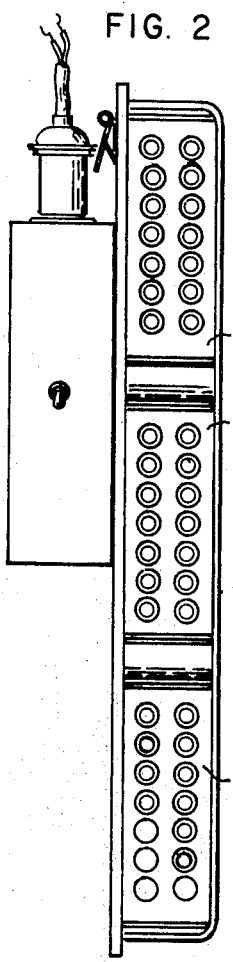
FIG. 1
FIG. 2
FRITZ K. MUELLER,
BILLY O. MARTIN,
ROBERT C. MARTIN,
BOBBY J. STRICKLIN,
AND
RAYMOND L. WEEKS,
    INVENTORS.
BY
*Alvin E. Moore*
ATTORNEY.

ELECTRONIC THERMOMETER

Some of the objects of the present invention are to provide a thermometer that: (1) requires very little time of operation; (2) is highly and quickly accurate, being readable in degrees and tenths of degrees; (3) avoids infection when used for measurement of a patient's temperature; and (4) comprises improved circuitry comprising voltage summing means and means for producing a series of incrementally varying voltages, varying in one direction from a basic voltage, supplying current to and measuring current from the thermistor. These and other objects of the invention will become more readily apparent in the following specification and the accompanying drawings.

In these drawings:

FIG. 1 is a plan view of the electronicthermometer assembly;

FIG. 2 is a side view of the main supporting member of the assembly, showing packs of disposable probe sheaths in place;

Figure 3:
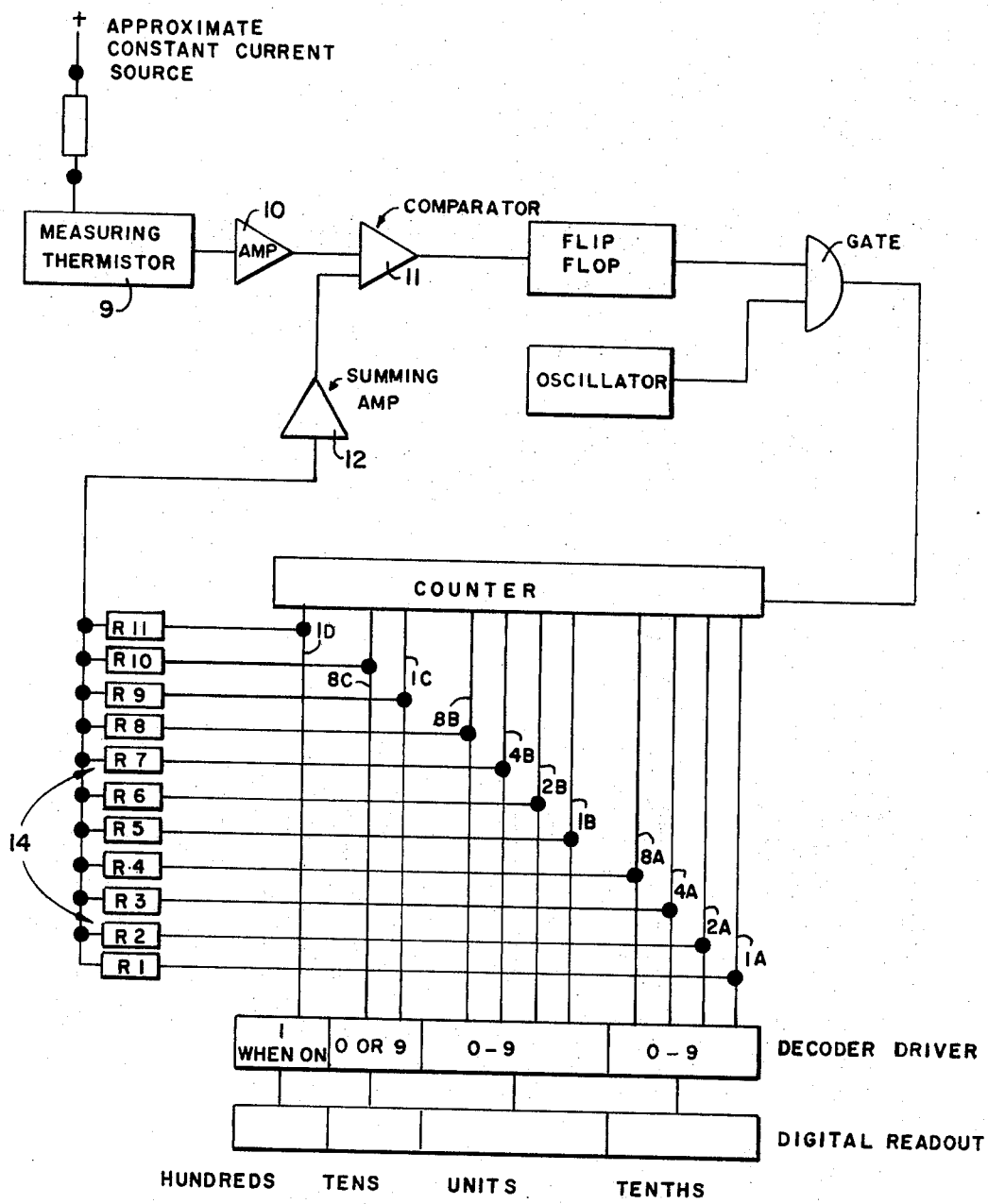
FIG. 3 is a block diagram of one form of the electronic circuitry of the invention.

The final assembly of the invented thermometer, shown in FIGS. 1 and 2, comprises: a main, box-like supporting member 1, a temperature chart 2, removably attached by the spring-actuated clamp 3 to the upper face of the member 1; a thermometer case 4; a probe 5, supported when not in use in the socket 5A of the case 4; a resiliently spiralled current-conducting means 6, leading from the probe to circuitry that is inside the case 4; and a plurality of packs or cartons of disposable sheaths, 7.

ELECTRONIC CIRCUITRY

Figure 4:
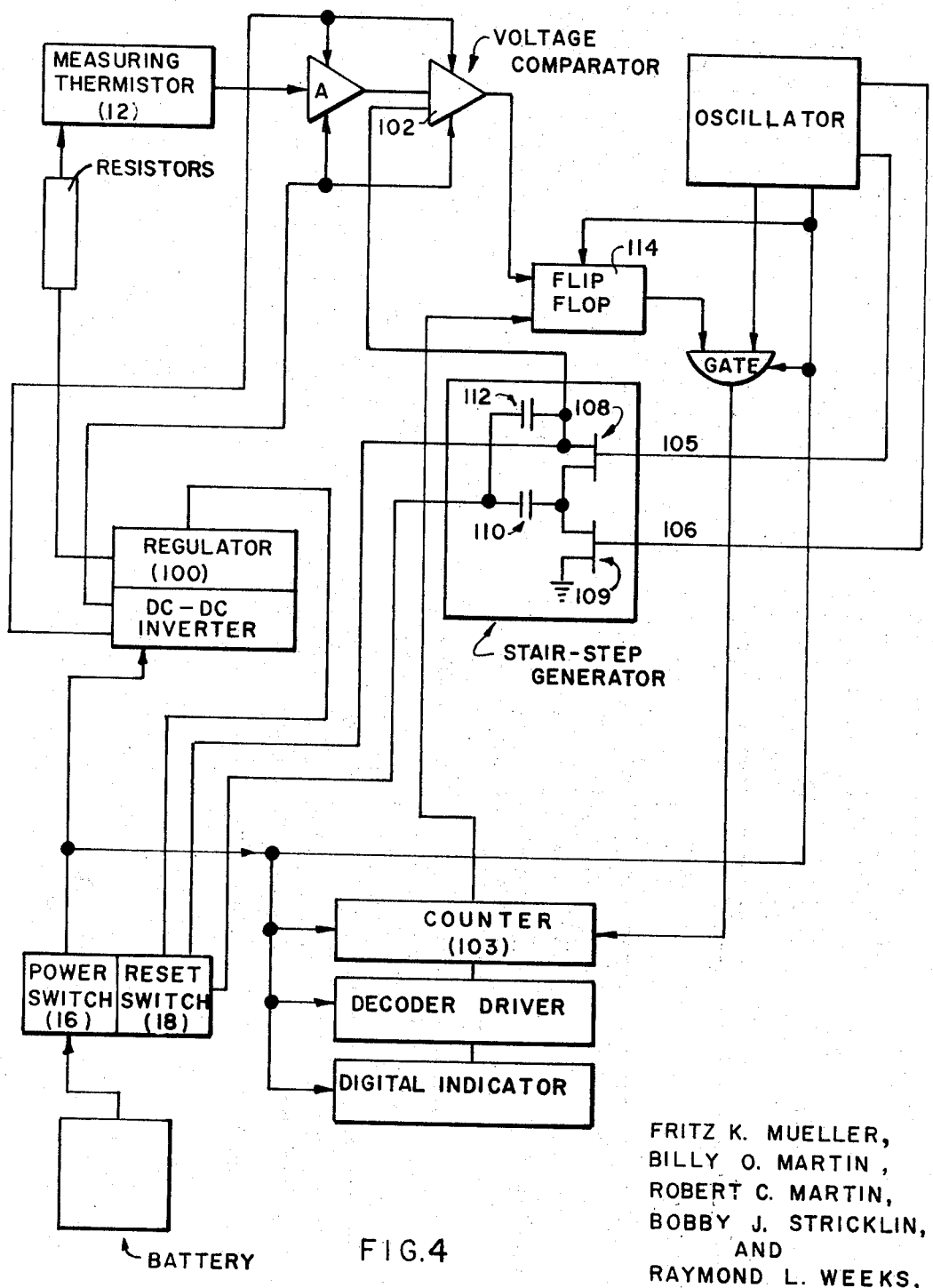
FIG. 4 is a block diagram of a second, optional form of the circuitry.

The electronic system utilized in the thermometer optionally may comprise the circuit of FIG. 3 or of FIG. 4. In operation of the main measuring and indicating circuit, the operator moves the power switch (for example the toggle switch 8 of FIG. 1) — or a pushbutton type switch — to connect all the batteries to the circuit. With reference to FIG. 3, for example, voltage is thus supplied to the constant-current source, amplifier, voltage comparator, flip-flop element, oscillator, counter and digital indicator. The constant-current source, a known type of transistor circuit, causes a small, constant-amperage current to flow to the measuring thermistor 9. This current causes a voltage drop across the thermistor that is proportional to the resistance in the semi-conductive material of the thermistor and therefore is proportional to the temperature of the thermistor. The resulting small voltage is amplified in the amplifier 10 and supplied to the voltage comparator 11, which compares the voltage from the amplifier 10 with that from the voltage summing device (the summing amplifier) 95. The voltage from the summing amplifier increases in steps or increments, based on the voltage steps or increments provided by the group of resistors, as explained below.

In the meantime the output voltage of the oscillator is actuating the counter. This counter, of a known type, comprises a circuit for counting in tenths of a degree, a circuit for counting in units and a circuit for counting in tens. The counter, comprising transistors, is preset to begin counting at a predetermined number of degrees, less than any probable temperature to be measured, for example, 90°; and it accordingly actuates the digital indicator. The counter is connected to a group of wires for each digit below 100, and as shown to one wire for the "hundreds" place on the indicator. The voltage output from the counter consists of fixed voltage levels in a binary-coded-decimal (BCD) sequence. The digital indicator decodes these voltages to a decimal indication.

In addition, these output voltages are connected through a group 14 of fixed resistors to the input of the summing amplifier. These resistors, of different values, are selected so as to produce a current flow which is proportional to the binary-coded decimal weight of each output line, and these weighted currents are summed by the summing amplifier so as to produce an output voltage proportional to the summed currents of the inputs. Therefore, the summing amplifier output is a voltage which is directly proportional to the decimal number appearing at any time on the digital indicator. This number continues to increase until the stair-stepped output voltage from the amplifier 12 equals that from 10. When the output of the summing amplifier thus reaches the output voltage of the temperature-sensing-circuit amplifier 10 the voltage comparator 11 sends an output signal to the flip-flop element, which then sends a signal that opens the gate. This disconnects the oscillator from the counter, and the reading of the indicator then remains in the last counted position. This accurately indicates the temperature of the patient's body or other object being measured, because the oscillator frequency is such as to provide enough time to elapse to allow the temperature of the measuring probe tip assembly to stabilize. The oscillator frequency used depends on the characteristics of this tip assembly. The frequency of the oscillator used in this invention is relatively high (providing for little time in counting) because of the combined thinness of the invented foil, probe-shaft-end edge and thermistor.

The voltage appearing on each of the lines 1A to 1D is either zero or a fixed voltage (for example, 5 volts). Each fixed-value voltage (5 volts) is applied across a selected one of the resistors 14 to produce a current proportional to the position of one of the voltage lines in the BCD sequence. For example, the first oscillator pulse produces a voltage on line 1A of the tenths-output group of four lines. This line 1A is connected via the decoder driver to the one-tenth of a degree digit of the readout or indicator. The line 1A also is connected to the resistor R1, of highest resistance in the group 14. Thus the current thru R1 produces the smallest step of resistor output voltage that is sent to and summed in the amplifier 12. The second pulse, by actuating transistors in the counter, causes the counter output voltage to go to zero on line 1A, while the voltage on line 2A goes to 5 volts and to the two-tenths of a degree digit of the indicator. The resistor R2, connected to line 2A, is one-half of the value of the resistor R1; therefore it produces an output voltage to the summing amplifier of twice the first output. The third pulse causes the counter to be connected to the three-tenths of a degree digit, and to produce a 5-volt output on both line 1A and line 2A, causing the two resistors' input to the summing amplifier to be three times the smallest stair-step voltage, from R1. The fourth pulse causes the counter to produce 5 volts on line 4A, while lines 1A and 2A go to zero. The resistor R3 has one-fourth of the value of the resistor R1, causing an output from R3 of four times the smallest step or increment. The tenth pulse from the oscillator causes the counter to send the 5 volts thru line 1B, while lines 1A, 2A, 4A and 8A go to zero voltage. The voltage from line 1B via the decoder is connected to the digit 1 of the indicator. Resistor R5, connected to line 1B has one-tenth of the value of R1; therefore the voltage output from R5 to amplifier 12 is ten times that from R1. The eleventh pulse causes the basic 5-volt voltage to go thru lines 1B and 1A, thus causing indication of the digits one and one-tenth in the readout. On this eleventh pulse the voltage remains on line 1B and resistor R5 and it is now also on line 1A and resistor R1. The resistor output voltage combined with that from R1 produces an input voltage to amplifier 12 that is 11 times that from R1.

When the sequence of indication starts at 90° (as is preferred in measuring body temperature) the counter has been preset to 90.0. Consequently the lines 1C and 8C are transmitting voltage causing the digit 9 to appear in the tens group of digits. This 9 continues to appear until 100 is reached. At that time the voltage in lines 1C and 8C goes to zero and zero indication appears in the "tens" group. At this same time (of the hundredth pulse from the oscillator) the 5 volts appear on line 1D, causing the digit 1 to be shown in the "hundreds" place, and causing a voltage output from resistor R11 which has a value of one hundred times that of the voltage from R1. During this indication of 100° all the lines except 1D have zero voltage. With the 1 remaining on the "hundreds" place and 0 remaining in the "tens" place a sequence of tenths of degrees and units of degrees begins again, thus causing indication of degrees and tenths above 100.

When the stabilized and amplified thermistor voltage, from amplifier 10, is equaled by the voltage from the summing amplifier 12, the comparator 11 triggers the flip-flop causing the gate to open. This stops the oscillator pulses and causes the counter and readout to hold the last digital indication until the switch is moved into its off position.

The above sequence refers to stair-stepped voltages that are increased in increments toward the stabilized and amplified voltage from the thermistor. Alternatively, the series of resistor-caused voltages may be stair-stepped down from a larger basic voltage to equalization with the amplified voltage from the thermistors. In forming such increments that decrease during operation of the oscillator: the summing amplifier 12 is biased to produce a beginning positive output voltage of 6 volts; this amplifier is operated in the inverting mode, converting the input steps from the resistors into negative steps, thus subtracting each successive increment from the basic 6-volts; and also changing the amplifier 10 into inverting mode.

An optional electronic system for use in the thermometer is shown in FIG. 4. Power is supplied to this circuit, as well as to the circuit of FIG. 3, by four rechargeable batteries of 5 volts DC. The basic active elements of the circuit are transistors, linear operational amplifiers, and digital counting integrated circuit components. The basic transistors and digital components are powered directly from the five-volt batteries, while the linear integrated circuit amplifiers require ±9 volts. A DC-DC transistor inverter is used to convert the 5 volts to ±9 volts. A portion of the 9-volt power is regulated to approximately 6 volts for use in the thermistor and stair-step generator circuits.

The thermistor 9, supplies a voltage proportional to its temperature (approximately 200 millivolts); and the circuit converts this small analog voltage to a digital readout. The voltage proportional to temperature is formed by passing a relatively constant current through the thermistor and measuring the voltage developed across it. This analog voltage is converted to a digital readout by the following pulse-controlled voltage feedback conversion method.

In operation of the main measuring and indicating circuit, the operator simultaneously moves the main power switch 16 and reset switch 18 (for example the toggle switch means 8 shown in FIG. 1) — or a push-button type of switch — to connect the batteries to the circuit. With reference to FIG. 4, voltage is then supplied to all the circuit elements. The regulated voltage from the 6-volt regulator 100 is applied to the thermistor circuit, comprising resistance means, and causes a small amount of current to flow through the thermistor. This current generates the small voltage proportional to the thermistor temperature and feeds it into the amplifier A, where it is amplified and supplied into the comparator 102. Simultaneously, the multivibrator (oscillator) begins to supply trigger pulses into the counter and stair-step generator. The counter 103 is preset to begin counting from a value selected to be lower than ordinarily measured body temperature, for example, 90°; and the stair-step generator is preset to begin operation at a 6-volt output. From this 6-volt value its output is decreased in steps by small increments, for example 10 millivolts — down to the stabilized and amplified voltage from the thermistor.

The oscillator periodically supplies voltage pulses to the stair-step generator and the counter 103. On receiving each pulse the counter (of the integrated-circuit type) causes the decoder-driver to advance the readout of the digital indicator by one-tenth of a degree. At the same time a pulse is received by the stair-step generator — alternately via lines 105 and 106, and the transistors 108 and 109 are alternately switched on and off. The capacitor 110 is much smaller in capacity than the voltage-summing capacitor 112, for example in the ratio of 0.03 to 66. When a pulse is supplied thru line 106 the transistor 109 turns on, providing a path to ground, and as a result the capacitor 110 charges to 6 volts, which for the time being is held. Now the oscillator supplies a pulse via line 105 to the transistor 108, turning on 108, and at the same time the pulse disappears from the transistor 109. The pulse in transistor 108 connects the capacitors and causes the charge on the capacitor 110 to be transferred to the larger capacitor or voltage-summing device 112. Because of the small capacity of 110 (for example, about 0.03 microfarads) the stair-step increment of voltage thus added to 112 is only a few millivolts.

The incrementally varying voltage from 112 is fed back to the comparator 102, which compares it with the level of the voltage from the thermistor amplifier. At this time the stair-step voltage is much greater than the output of the thermistor amplifier, so the comparator does not trigger; and another count is supplied into the counter and stair-step generator. This process is continued, decreasing the output voltage of capacitor 112 in equal small steps or increments, until the stair-stepped comparison voltage, continuously supplied to the comparator from the capacitor 112, reaches the level of the amplified thermistor output. At this time the comparator triggers the flip-flop 114, which closes the gate to the counter and stops it. The display holds this highest reading, which corresponds to the thermistor temperature, until the main switch is turned off. The lower the temperature of the probe, the fewer the steps (and display counts) required to trigger the comparator. Likewise, the higher the temperature the higher the number of steps required before the comparator triggers. By proper matching of the shape of the thermistor voltage output curve versus the temperature curve and the amplitude of the stair-step pulses, the system is calibrated so that the reading at which the display stops each time is an accurate indication of the thermistor temperature.

Although the above-described stair-step generator circuit is preferred, the same general type of circuit optionally may be utilized but with the steps or increments of change in generator output voltage adding to the first basic voltage output, instead of reducing this output as described above. In this alternative operation of the circuit: the amplifier 10 is operated in its inverted mode; and in the stair-step generator the polarity is reversed by: applying the positive, regulated 6 volts to the transistor 109 (instead of to the ground as shown in FIG. 17), thru the reset switch 18; and grounding the common terminals of the capacitors 110 and 112.

In the following claims: unless otherwise qualified the word "increment" signifies either a small increase or a small decrease in value.

We claim:

1. An electronic thermometer, comprising:
a probe, having a temperature-measuring thermistor;
an indicator, for indicating the temperature of an object in contact with the said probe; and
electronic circuitry, connected to said thermistor and indicator, comprising: an electric battery, supplying a relatively small voltage; a power switch connected to said battery; a D.C.-D.C. transistor inverter, connected to said battery, converting said relatively small voltage to a higher voltage; a thermistor-voltage amplifier, connected to said thermistor and transistor inverter, receiving a portion of said higher voltage; a voltage comparator, connected to said amplifier and to said inverter, receiving a portion of said higher voltage; a regulator, receiving a portion of said higher voltage and regulating it to provide a basic output voltage having a value between said small voltage and higher voltage; means electrically connecting said regulator and thermistor, comprising resistance means; an oscillator, connected to said power switch; a counter, connected to said power switch and to said oscillator; means electrically connecting said oscillator and counter, comprising a gate; a decoder driver, connected to said power switch, counter and indicator; means, connected to said oscillator, voltage comparator and regulator, for supplying summed, incrementally varying voltages, varying in one direction from said basic voltage, comprising a first transistor and a second transistor that alternately receive voltage pulses from said oscillator, a capacitor connected to said first transistor having a capacity of less than a microfarad, a second capacitor having a capacity well above that of said first-named capacitor, capable of being charged to a plurality of volts, connected to said first-named capacitor and receiving increments of voltage from it, and conductors connecting said oscillator, transistors, capacitors and voltage comparator; a flip-flop, connected to said comprator and said gate, receiving triggering voltage from the comparator when the voltages from said second capacitor and said thermistor-voltage amplifier are equal, supplying voltage to said gate, for disconnecting the said counter from said oscillator.

2. A thermometer as set forth in claim 1, comprising a reset switch, connected to said regulator and said means for supplying summed voltages.

3. A thermometer as set forth in claim 2, in which: said thermistor-voltage amplifier is in inverted mode; and said reset switch is electrically connected to said first-named transistor, applying positive voltage from said regulator to said first-named transistor.

* * * * *